United States Patent Office 3,300,418
Patented Jan. 24, 1967

3,300,418
FOAMED MATERIALS FROM POLYEPOXY COMPOUNDS
Karl-Heinz Andres, Cologne-Flittard, Hans-Horst Steinbach, Leverkusen-Mathildenhof, and Klaus Damm, Cologne-Flittard, Germany, assignors to Farbenfabriken Bayer Aktiengesellschaft, Leverkusen, Germany, a German corporation
No Drawing. Filed Jan. 2, 1963, Ser. No. 248,865
Claims priority, application Germany, Jan. 13, 1962, F 35,773
4 Claims. (Cl. 260—2.5)

The present invention relates to foamed materials from polyepoxy compounds and more specifically to a process for preparation of such foamed materials with the aid of specific foam stabilizers.

It is known to foam polyepoxy compounds with the aid of boranates, which liberate hydrogen as blowing gas. The process takes place at room temperature and aliphatic or cycloaliphatic polyamines are used as cross-linking agents for the polyepoxy compound.

It is also known to stabilise the aforesaid systems during foaming, for example, by adding fatty acids of higher molecular weight, fatty alcohols, metal alcoholates, in particular partially hydrolysed reaction products of lower metal alcoholates and hydroxy ethylated alcohols of higher molecular weight, such as described in German patent specification 1,122,049.

The foam materials obtained in this way have, however, various disadvantages. In the first place, the foaming process is generally completed too quickly, so that discolouration or scorching can occur in the foam core. Secondly, only comparatively small amounts (of about 100 g.) can be produced without defects, i.e. free from blowholes or faulty zones. The lower limit of the weight per unit volume is moreover in the region of 30 kg./m³, so that the lower range of weights per unit volume which is of practical interest for many purposes is not obtainable.

It has now been found that the aforementioned disadvantages can be avoided if the production of foam materials based on reaction products of polyepoxy compounds and polyamines, using boranates as blowing agents, is effected in the presence of particular organopolysiloxanes as foam stabilizers.

The particular organopolysiloxanes to be used for the present process are compounds which contain both epoxy groups and also SiH-groups. These organopolysiloxanes are characterized in that they comprise chain members of the structure (I)

(I) 

and also at the same time chain elements of the structure (II)

(II) 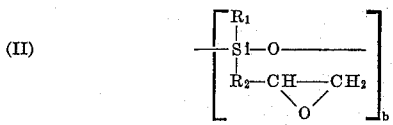

In the aforementioned organopolysiloxanes, the radicals —OSi(CH$_3$)$_3$ or —OH are to be considered as terminal groups for the silicon side of the above chain elements and the radicals —Si(CH$_3$)$_3$ or —H as terminal groups for the oxygen side of the above chain elements. In the above formula, R$_1$ represents an alkyl radical, preferably a saturated aliphatic hydrocarbon radical having from 1 to 10 carbon atoms, advantageously a methyl group or an aryl radical such as phenol, R$_2$ a divalent hydrocarbon radical with at least one carbon atom, which may also contain ether groupings, advantageously the ethylene radical —(CH$_2$—CH$_2$)—, the radical —CH$_2$—O—CH$_2$— or the radical —(CH$_2$)$_3$—O—(CH$_2$)—.

The ratio between the number $a$ of members (I) and the number $b$ of members (II) can vary between 1:10 and 10:1, advantageously between 1:3 and 2:1. The sum $a+b$ should be equal to or greater than 2 and does exceed 100 in normal cases. It is only with difficulty that an upper limit can be fixed, but with a high degree of polymerization, the viscosities of the compounds are so high that the incorporation by mixing into the epoxide resins is difficult, and thus the upper limit is fixed by the viscosity itself.

Preferred organopolysiloxanes comprise compounds which correspond to the following general Formula III (III) 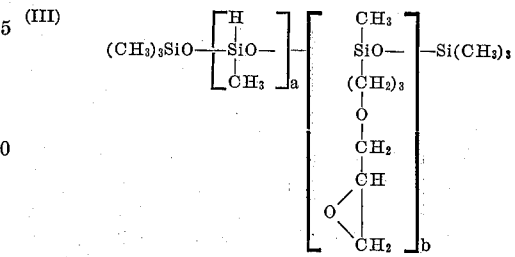

wherein $a$ stands for a whole number between 1 and 30, $b$ stands for a whole number between 2 and 50 and $b$ in all cases is greater than $a$.

Examples of the additives according to the invention are as follows:

(1) 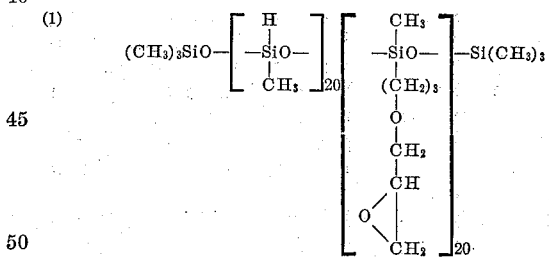

The ratio $a:b$ in this formula also may have (instead of 20:20) the most different values as indicated above, such as for example 10:10, 10:15, 10:30, 20:30, 30:50 etc. Of preferred interest are compounds wherein $b$ is greater than $a$.

(2a) 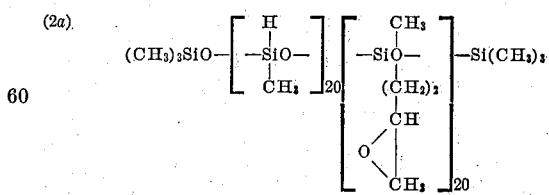

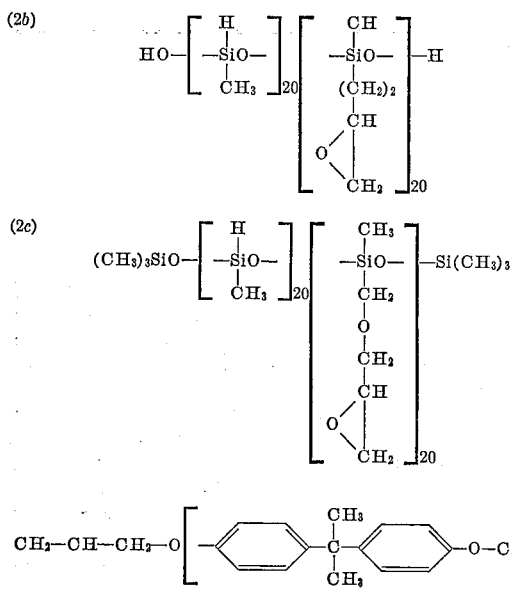

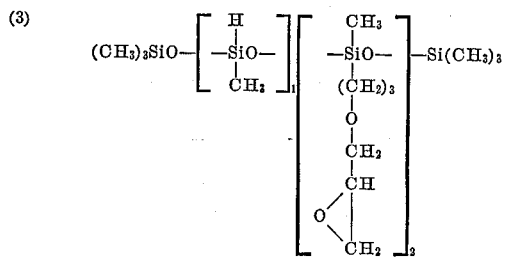

The ratio $a:b$ in this formulae also may vary within wide limits whereby as typical examples are to be mentioned the ratios 20:30, 30:70, 25:50. Compounds wherein $b>a$ are of preferred interest.

(3)

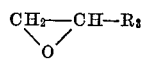

The ratio $a:b$ also in this formula may vary within the preferred range given above, such as for example 2:5 or 5:10. Compounds wherein $b$ is greater than $a$ are of preferred interest. These epoxyorganohydrogen polysiloxanes can for example be prepared by reacting epoxides of the formula $$CH_2\!-\!\!\!-\!CH\!-\!R_3$$
$$\diagdown\!O\!\diagup$$

in which $R_3$ is a radical containing an olefinic double bond, advantageously the —$CH_2$—O—$CH_2$—$CH$=$CH_2$ or —$CH$=$CH_2$, radical, which are readily obtainable technically, with siloxanes which contain SiH-groups. By choosing the proportions between siloxane and epoxide and by accurate control of the reaction at 150° C., a quantity of SiH-groups corresponding to the number $b$ is reacted and a quantity corresponding to the number $a$ remains unaffected.

Epoxyorganohydrogenpolysiloxanes which may be applied within the process of this invention furthermore may be obtained in analogous manner as described in Deutsche Auslegeschrift 1,061,321 and U.S.P. 2,883,397.

The process of the present invention is suitable for the foaming of various types of polyepoxy compounds, especially glycidyl polyethers of polyhydric compounds of the group consisting of polyhydric alcohols and phenols having at least two hydroxyl groups, said glycidyl polyethers having an epoxy equivalency of greater than 1 of which the following may be mentioned as example: the reaction products of epihalohydrines with 4,4'-dihydroxy diphenyl dimethyl methane, N,N-di-2,3-epoxypropyl aniline, N,N' - dimethyl - N,N' - di - 2,3 - epoxypropyl-4,4'-diamino-diphenyl methane, the diglycidyl ether of butane-1,4-diol and the triglycidyl ether of 1,1,1-trimethylol propane as well as polycyclodiepoxy ethers, such as epoxides of glycol-bis-oxodihydroxy dicyclopentadienyl ether, and epoxides such as those described by way of example in "Kunststoff-Rundschau" (1957), page 41 or in "Angewandte Chemie" 67 (1955), page 582 et seq.

Polyepoxy compounds which are of preferred interest within the present process are represented by reaction products of p,p'-di(hydroxyphenyl) propane (also known as bis-phenol A) with epihalohydrines (preferably in approximately stoichiometric amounts or an excess of epihalohydrine) in the presence of a hydrogen halide acceptor. The resultant epoxy compound consists of

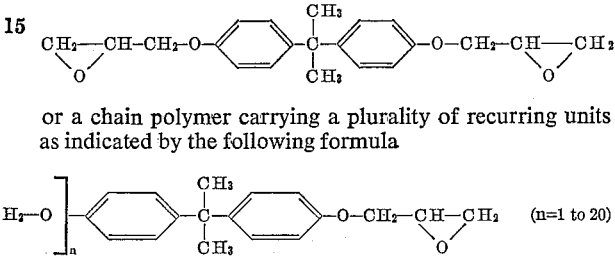

or a chain polymer carrying a plurality of recurring units as indicated by the following formula

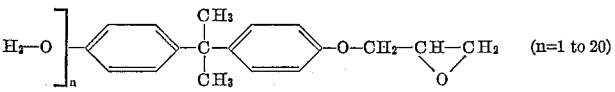

Specific two-component systems based on such reaction products of epihalohydrines with 4,4'-dihydroxy diphenyl dimethylmethane have proved advantageous, the one component of which has an epoxide equivalent between 180 and 240 (epoxide equivalent=the amount of resin in grams which contains one epoxy group; epoxy equivalency=number of epoxy groups per molecule) whereas the other component represents a polyepoxy compound of the same type but having an epoxide equivalent of between 300 and 400.

The cross-linking of these polyepoxy compounds is effected with aliphatic or cycloaliphatic polyfunctional amines (i.e. having at least two amino-groups which carry a hydrogen atom), in particular with aliphatic or cycloaliphatic, primary or secondary as well as primary secondary polyamines. Examples of such amines are: aliphatic saturated diamines such as ethylene diamine, propylen diamine, butylene diamine, polyalkylene polyamines, especially polyethylene polyamines such as diethylene triamine, triethylene tetramine, tetraethylene pentamine, pentaethylene hexamine, hexaethylene heptamine, butane-1,4-diol-diaminopropyl ether, $\omega,\omega'$-di-(ethylene diamino) dibutylether and 4,4'-diamino dicyclohexyl methane. As curing agents of specific interest are to be emphasized $\omega,\omega'$-di-(ethylene diamino)-dibutyl ether, triethylene tetramine and tetraethylene pentamine.

The aforementioned amines can not only be used in equivalent quantities, but also in less than equivalent quantities down to about 30%, they may also be used in an excess up to about 50% above the equivalent quantity if desired, the equivalency being based on the ratio between the epoxy groups and amine hydrogen atoms.

Boranates for the foaming process include the boranates of the alkali metals, earth alkali metals and zinc such as for example sodium boranate, potassium boranate, calcium boranate, magnesium boranate or zinc tetramine boranate.

The quantity of the boranates to be used is 0.5 to 10% and advantageously 1 to 4%, based on the weight of the polyepoxy compounds introduced.

The foam materials can be prepared by mixing together resin, amine and stabiliser, if desired with an accelerator for development of the blowing gas and a diluent as well as the boranate. The operation is in most cases carried out at temperatures between 10 and 30° C., preferably at room temperature, but obviously the use of higher temperatures is not excluded in special cases, for example with high viscosities. It is particularly advantageous to prepare a solution from the amine and boranate and if desired accelerator for developing the blowing gas, which solution is combined with the mixture of resin, stabiliser and if desired the diluent. The mixing which is carried out at room temperature can be effected both by stirring manually or mechanically in various ways, depending on the size of the batch.

The organopolysiloxanes used in the foaming according to the process of the invention are preferably employed in quantities of 0.5 to 10% and advantageously 2 to 4%, based on the weight of the polyepoxy compounds used.

Foam formation starts after 10–300 seconds. After a further 20–300 seconds, the batch reaches its maximum height and shortly afterwards the hardening, which already starts during the blowing process, is completed.

Foaming in accordance with the present process can be accelerated by the use of additives, such as water or alcohols, in particular lower aliphatic monohydric alcohols. Such compounds may be added in the range of about 0.3 to 6%, based on the weight of the polyepoxy compound used.

Furthermore, diluents can be introduced into the foaming mixture which diluents may serve as additional blowing agents, during the blowing and hardening process because of the exothermic reaction. Various types of organic solvents are suitable diluents such as esters, ketones, ethers, hydrocarbons and, in particular halogenated hydrocarbons, for example methylene chloride, dichlorethylene, trichloroethylene and trichloromonofluormethane. The quantities added are 5–60% and advantageously 10–30%, based on the weight of the polyepoxy compound being used. In this way, the weight per unit volume of the foam materials can be further reduced and an improvement in the heat-insulating properties of the foamed epoxy resin can be obtained.

Foaming can advantageously be carried out in restricted or closed moulds, and it is thus possible in a simple manner to produce composite materials which are suitable as elements for building construction or insulation purposes. These epoxy resin foams are suitable for all purposes where rigid foams have proved advantageous such as building panels, refrigerators etc.

The organopolysiloxanes to be used in the process according to the present invention have proved to be excellent foam stabilisers when producing foam materials based on reaction products of polyepoxy compounds and polyamines. In addition, the said organopolysiloxanes yield additional hydrogen as a blowing gas during the foaming with boranates and the cross-linking of the epoxy resin with the amine which occurs concurrently.

The foam materials which are obtained are characterized by a regular homogeneous structure and have good mechanical strength properties and high temperature resistivity.

For example, with a foam having a density of 20 kg./m.³, the compressive strength is for example 0.8 kg./cm.² and the heat distortion is 125° C.

In accordance with the present process, it is moreover possible, even where the conditions for removal of heat are unfavourable to foam satisfactorily mixtures in a quantity which may for example be 10 times the quantities already mentioned above.

Further details of the process will be apparent from the following examples, in which the parts are parts by weight, unless otherwise indicated.

*Example 1*

70 parts of diglycidyl ether of 4,4'-dihydroxy-diphenyl dimethyl methane (epoxide equivalent 200) and 30 parts of diglycidyl ether of 4,4'-dihydroxy-diphenyl dimethyl methane (epoxide equivalent 350) are stirred with 4 parts of the stabiliser indentified as under No. 1 in the foregoing description. This system is then mixed with 12 parts of triethylene tetramine and 0.5 part of water. A foam is obtained which has a weight per unit volume of 21 kg./m.³.

The organopolysiloxane is prepared in the following way:

An oil is produced by hydrolysis of 94 parts of methyl hydrogen dichlorosilane $(CH_3)HSiCl_2$ and 6 parts of trimethyl monochlorosilane $(CH_3)_3SiCl$ in water, which oil has a viscosity of 20–30 cst. at 20° C. 100 parts of this oil are reacted with 66 parts of allyl glycidyl ether at 150° C. using platinum on aluminium oxide as catalyst. The oil obtained has the formula

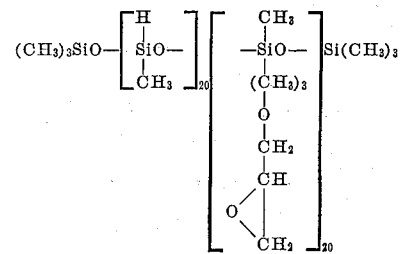

In analogous manner an epoxypolysiloxane with $a=10$ and $b=30$ may be prepared. If a polyepoxide composition as defined above is foamed and cured as described in the foregoing a foam having a weight per unit volume of 20 kg./m.³ is obtained. Curing similarly may be performed by employing butane-diol(1,4)-diaminopropyl ether instead of the above-mentioned amine.

*Example 2*

70 parts of diglycidyl ether of 4,4'-dihydroxy-diphenyl dimethyl methane (epoxide equivalent 200) and 30 parts of diglycidyl ether of 4,4'-dihydroxy diphenyl dimethyl methane (epoxide equivalent 350) are stirred with 4 parts of the stabiliser identified as 1 in the foregoing description. This system is then mixed with a solution consisting of 20 parts of sodium boranate and 3 parts of methanol. A foam is obtained which has a weight per unit volume of 28 kg./m.³.

The stabiliser referred to under No. 1 is used.

*Example 3*

70 parts of diglycidyl ether of 4,4'-dihydroxy diphenyl dimethyl methane (epoxide equivalent 200) and 30 parts of diglycidyl ether of 4,4'-dihydroxy diphenyl dimethyl methane (epoxide equivalent 350) are stirred with 4 parts of the stabiliser identified as 1 in the foregoing description and 15 parts of dichloroethylene. This system is then mixed with a solution consisting of 20 parts of ω,ω'-di-(ethylene diamino) dibutylether, 2.5 parts of sodium boranate and 2 parts of methanol. A foam with a weight per unit volume of 23 kg./m.³ is obtained.

The stabiliser referred to under No. 1 is used.

*Example 4*

70 parts of diglycidyl ether of 4,4'-dihydroxy diphenyl dimethyl methane (epoxide equivalent 200) and 30 parts of diglycidyl ether of 4,4'-dihydroxy diphenyl dimethyl methane (epoxide equivalent 350) are stirred with 4 parts of the stabiliser identified as 1 in the foregoing description and 12 parts of trichloromonofluormethane. This system is then mixed with a solution consisting of 20 parts of ω,ω'-di-(ethylene diamino) dibutyl ether, 2.5 parts of sodium boranate and 2 parts of methanol and a foam with a weight per unit volume of 24 kg./m.³ is obtained.

The stabiliser referred to under No. 1 is used.

*Example 5*

70 parts of diglycidyl ether of 4,4'-di-hydroxy diphenyl dimethyl methane (epoxide equivalent 200) and 30 parts of glycidyl ether of 4,4'-dihydroxy diphenyl dimethyl methane (epoxide equivalent 350) are stirred with 6 parts of sodium boranate and 6 parts of the stabiliser identified as 2 in the foregoing description. This system is then mixed with 12 parts of triethylene tetramine, 2 parts of methanol and 1.2 parts of water. A foam is obtained which has a weight per unit volume of 18 kg./m.³.

The organopolysiloxane used as stabiliser is prepared as follows:

100 parts of the oil described in Example 1 with the viscosity of 20–30 cst. at 20° C. are reacted with 55 parts of butadiene monoxide

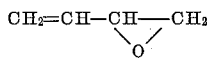

at 100° C. using platinum on aluminium oxide as catalyst. The oil obtained has the composition

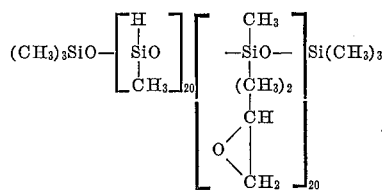

*Example 6*

70 parts of diglycidyl ether of 4-4'-dihydroxy diphenyl dimethyl methane (epoxide equivalent 200) and 30 parts of diglycidyl ether of 4,4'-dihydroxy diphenyl dimethyl methane (epoxide equivalent 350) are stirred with 4 parts of sodium boranate, 10 parts of dichlorethylene and 4 parts of the stabiliser identified as 3 in the foregoing description. This system is then mixed with 1–2 parts of triethylene tetramine, 2 parts of isopropyl alcohol and 1 part of water and a foam with a weight per unit volume of 19 kg./m.³ is obtained.

The organopolysiloxane used as stabiliser is prepared as follows:

100 parts of trimethyl monochlorosilane ((CH₃)₃SiCl) are mixed with 160 parts of methyl hydrogen dichlorosilane ((CH₃)HSiCl₂) and hydrolysed in water to an oil of the composition

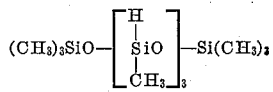

100 parts of this oil are reacted with 98 parts of allyl glycidal ether at 150° C., using platinum as catalyst. The reaction product is an oil of the composition

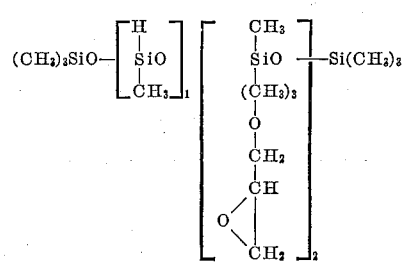

*Example 7*

60 parts of diglycidal ether of 4,4'-dihydroxy diphenyl dimethyl methane (epoxide equivalent 200) and 30 parts of diglycidyl ether of 4,4'-dihydroxy diphenyl dimethyl methane (epoxide equivalent 350), 10 parts of the triglycidyl ether of 1,1,1,-trimethylol propane are stirred with 6 parts of potassium boranate and 10 parts of tri- chloromonofluormethane and 5 parts of the stabiliser identified as 2 in the foregoing description. This system is then mixed with 20 parts of ω,ω'-di-(ethylene diamino) dibutyl ether, 3 parts of methanol and 1 part of water. A foam having the weight per unit volume of 22 kg./m.³ is obtained.

The organopolysiloxane according to Example 5 is used as stabiliser.

We claim:

1. In a process for foaming and resinifying a glycidyl polyether of a polyhydric compound of the group consisting of a polyhydric alcohol and a phenol having at least two hydroxyl groups, said glycidyl polyether having an epoxy equivalency of greater than 1, using
   (a) a boranate of metal selected from the group consisting of an alkali metal, an earth alkali-metal and zinc blowing agent and
   (b) a polyfunctional amine selected from the group consisting of primary and secondary polyfunctional amines as curing agent, the improvement which comprises foaming and curing the mixture of said glycidyl polyether, blowing agent and curing agent in the presence of 0.5 to 10% based on the weight of said glycidal polyether of an organopolysiloxane having
      (a) chain members of the structure (I)

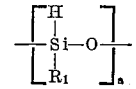

(I)

and at the same time
      (b) chain members of the structure (II)

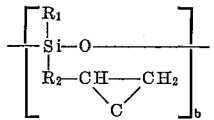

(II)

wherein in Formulae I and II R₁ represents a a member selected from the group consisting of a saturated aliphatic hydrocarbon radical having from 1 to 10 carbon atoms and a phenyl radical, wherein R₂ is a radical selected from the group consisting of

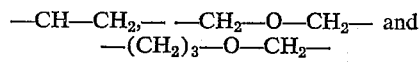

said organoploysiloxane containing as terminal group for the silicon side a member selected from the group consisting of —OSi(CH₃)₃ and —OH, and containing as terminal group for the oxygen side a member selected from the group consisting of —Si (CH₃)₃ and —H.

2. A process as claimed in claim 1 which comprises using as organopolysiloxane a compound according to Formula III

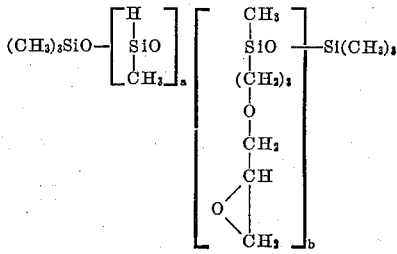

wherein *a* stands for a whole number between 1 and 30, *b* stands for a whole number between 2 and 50 and *b* in all cases is greater than *a*.

3. A process as claimed in claim 2 which comprises employing as foam stabiliser an organo polysiloxane as claimed in claim 2 when foaming a polyepoxy component which represents a reaction product an epihalohydrine with 4,4'-dihydroxy diphenyl dimethyl methane in presence of a polyfunctional amine which represents a member selected from the group consisting of a polyalkaline polyamine and ω,ω'-di(ethylene diamino)-dibutyl ether.

4. Process according to claim 1, characterized in that organopolysiloxanes are used in which the ratio between the chain members $a$ and $b$ is between 1:10 and 10:1 and the sum of $a+b$ is equal to or greater than 2.

References Cited by the Examiner
UNITED STATES PATENTS

| | | | |
|---|---|---|---|
| 3,025,249 | 3/1962 | Chen | 260—2.5 |
| 3,131,161 | 4/1964 | Nitzsche | 260—42 |

MURRAY TILLMAN, *Primary Examiner.*

JAMES A. SEIDLECK, *Examiner.*

M. FOELAK, *Assistant Examiner.*